June 27, 1950 F. A. HESTER 2,512,647

SYNCHRONIZING CIRCUIT

Filed Jan. 21, 1947

FRANK A. HESTER
*INVENTOR.*

BY Alfred W. Barber
ATTORNEY

Patented June 27, 1950

2,512,647

UNITED STATES PATENT OFFICE 2,512,647

SYNCHRONIZING CIRCUIT

Frank A. Hester, New York, N. Y., assignor to Faximile, Inc., New York, N. Y., a corporation of Delaware Application January 21, 1947, Serial No. 723,363

10 Claims. (Cl. 178—69.5)

The present invention concerns electrical circuits and apparatus and, in particular, synchronizing devices for facsimile and the like.

There are many examples in the electrical field where it is desirable to operate a motor or other driving mechanism in synchronism with another motor or driving mechanism often located at a remote point. Where a common source of alternating current is available to both devices synchronism may be secured in a very simple manner i. e. by utilizing synchronous motors driven from a common source of alternating current. There are many other instances where a common source of alternating current is not available to the two devices and synchronism must be achieved in a different manner. For example, in the facsimile art, it is often desirable to transmit signals representing a copy to be reproduced over a radio channel to a distant point and at the same time to transmit information or signals which will control a remote scanner and keep it accurately in synchronism with the transmitter. It is common practice in the facsimile art to scan copy line by line and to utilize a space between the signals representing each line for the transmission of a synchronizing impulse. The present invention concerns new, simple, and effective circuits and apparatus for utilizing such a synchronizing impulse to control the speed of the apparatus at the receiving end of a facsimile system or the like.

According to the present invention a facsimile recorder drum is operated from a synchronous type motor which is driven from a source of alternating current including an oscillator the frequency of which may be controlled by the application of a control voltage. The constants of the oscillator circuits are such that in the absence of control voltage the motor will be driven at a speed which will be lower than any synchronous speed which may be required of the system. Also, the maximum control voltage which the system may generate is sufficient to operate the controlled oscillator at a frequency such that the motor will operate at a speed higher than any speed which will be required in the system. While the particular embodiment to be described will operate in this manner it will be obvious to those skilled in the art that it may be operated in an inverted manner interchanging high and low frequency conditions and inverting the polarity of the control voltage without altering the principle of operation. At the end of each line of transmission the oscillator frequency is instantaneously returned to its original condition and a control voltage is generated in accordance with the time of occurrence of the synchronizing impulse which, of course, depends on whether the oscillator frequency is higher or lower than the exact synchronous frequency required.

One object of the present invention is to provide a simple method and means for controlling the speed of a motor driving a facsimile recorder or the like in accordance with a series of synchronizing impulses.

Another object of the present invention is to provide a simple and efficient method and means for both synchronizing and framing a facsimile recorder or the like in accordance with the time of occurrence of a series of synchronizing impulses.

Still another object of the present invention is to instantaneously correct the speed of a motor or the frequency of an oscillator in accordance with a series of synchronizing impulses upon the occurrence of each impulse.

These and other objects will be evident from the detailed description of the invention given in connection with the various figures of the drawing.

Figure 1:
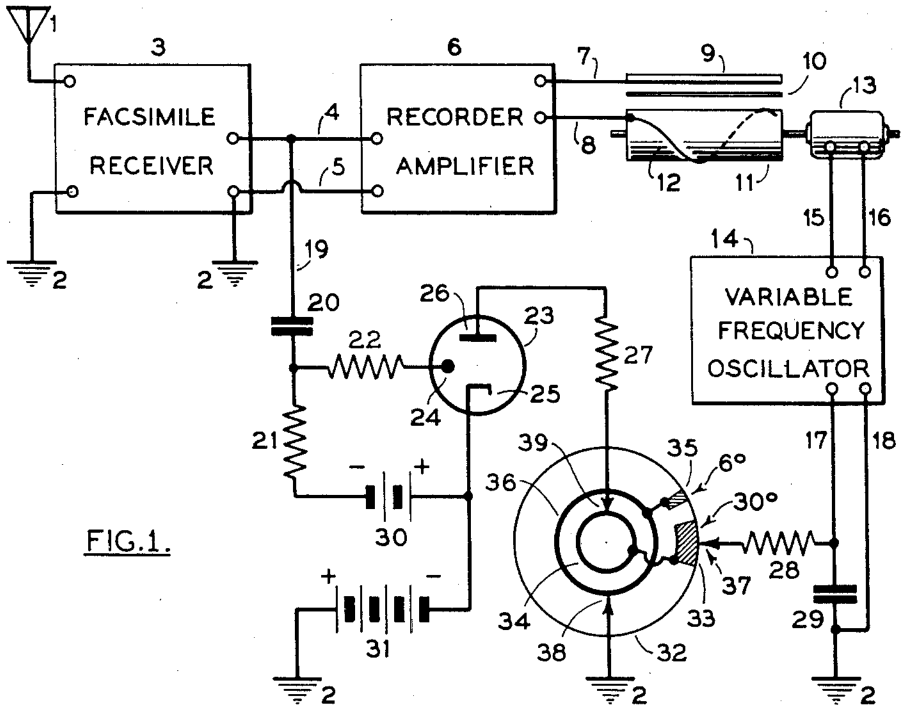
Fig. 1 shows one embodiment of the present invention.
Figure 2:
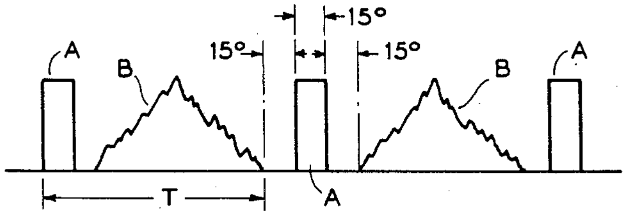
Fig. 2 shows the type of control signal which may be used with the present invention.

Fig. 1 shows a facsimile recorder embodying one form of the present invention and utilizing signals received by radio. Fig. 1 shows a facsimile receiver 3 connected to antenna 1 and ground 2 feeding a recording amplifier over wires 4 and 5 and a thyratron control tube 23 over wire 19. Recorder amplifier 6 is utilized to apply recording signals to a scanner consisting of drum 11 carrying helical recording electrode 12, linear electrode 9 for cooperating with the helical electrode to record upon a recording sheet 10, and a motor 13 for driving drum 11 at a predetermined speed. The recording signals are applied between helical electrode 12 and linear electrode 9 from recorder amplifier 6 over leads 8 and 7 respectively. Motor 13 may be any suitable synchronous type having the characteristic of operating at a predetermined speed when supplied with alternating current of a given frequency. The controlling alternating current is generated by a variable frequency oscillator 14 and applied to motor 13 over leads 15 and 16. Variable frequency oscillator 14 may be any suitable type the frequency of which may be controlled by means of the control voltage. An oscillator particularly suited to this application has been described in patent application entitled "Variable Frequency Oscillator" filed August 10, 1946, and bearing Serial Number 689,792. Variable frequency oscillator 14 is controlled by a control voltage generated across condenser 29 and applied to oscillator 14 over leads 17 and 18. The control voltage is generated through the joint operation of thyratron 23 and commutator 32. Commutator 32 is rotated at the same speed as recorder drum 11 preferably by attaching it to the shaft of the drum. Commutator 32 includes a segment 35 of approximately 6° of arc and a segment 33 of approximately 30° of arc each of these segments contacting contact 37 which connects to condenser 29 through time constant determining resistor 28. Segment 35 is grounded through slip ring 36 and contact 38. Thyratron 23 having cathode 25 heated by conventional means not shown, control electrode 24, plate 26 is connected to supply impulses through plate series resistor 27 to slip ring 34 through contact 39 whereby segment 33 is energized and condenser 29 is charged through resistor 28 as will be described below. Any convenient source of plate voltage may be utilized for thyratron 23 such as battery 31 connected between cathode 25 and ground 2. Thyratron 23 is normally maintained at cutoff by means of bias battery 30 connected to control electrode 24 through resistors 21 and 22. Pulses are applied to control electrode 24 from lead 19 through coupling condenser 20 and series resistor 22. If a synchronizing impulse such as that shown in "A" of Fig. 2 is applied to control electrode 24 from the facsimile receiver while contact 37 is making contact to segment 33 thereby loading the plate circuit of thyratron 23 current will be passed by thyratron 23 charging condenser 29 through resistors 27 and 28. As stated above variable frequency oscillator 14 operates at some low frequency in the absence of a control signal. Commutator 32 being connected to the drum shaft of the recorder rotates once for each line of copy to be reproduced by the facsimile recorder. As commutator 32 revolves segment 35 contacts contact 37 and discharges condenser 29 through resistor 28 returning the variable frequency oscillator 14 to a lower value determined by the time constant of resistor 28 and condenser 29. As commutator 32 revolves further the plate of thyratron 23 is connected through contact 39 and contact 37 across condenser 29 through resistor 28 and if a synchronizing impulse is received while contact 37 is riding on segment 33 a charge is placed upon condenser 29. The amount of this charge will depend on the length of time during which the impulse exists while contact 37 is contacting segment 33. If drum 11 lags in phase behind the required synchronism as indicated by the incoming synchronizing impulses the pulse will occur early in the contact time between contacts 37 and segment 33 and condenser 29 receives a relatively large charge which instantaneously raises the frequency of variable frequency oscillator 14. Upon the next revolution of commutator 32, condenser 29 is discharged by segment 35 effectively quenching the control voltage and another synchronizing impulse of current is applied to condenser 29. Since the previous cycle will have advanced the phase of segment 33 the charge applied to condenser 29 will be less than previously and oscillator 14 will be increased in frequency but in a lesser amount than previously. This process continues until drum 11 is in exact synchronism and phase with synchronizing impulses. If the phase of commutator 32 is far out so that the synchronizing impulses do not exist during the passage of commutator segment 33 under contact 37, oscillator 14 will operate at some low frequency causing the phase to shift continuously until the impulse does come in during the passage of commutator segment 33 under contact 37 and the above process commences. If drum 11 rotates at too high a speed the synchronizing impulses occur late during the passage of commutator segment 33 under contact 37 placing only a small charge on condenser 29 and hence allowing the frequency of oscillator 14 to decrease. The frequency of oscillator 14 thus will decrease a small amount during each revolution of drum 11 until exact synchronism and phasing is accomplished.

While only one embodiment of the present invention is shown and described, many variations will be evident to those skilled in the art within the spirit and scope of the invention as set forth in the appended claims.

What is claimed is:

1. In a system for operating a synchronous motor at a predetermined frequency under the control of a series of synchronizing impulses, the combination of, an oscillator for determining the speed of rotation of said motor, momentary switching means for periodically setting the frequency of said oscillator to some approximate predetermined frequency, and means for periodically shifting the frequency of said oscillator after said setting in the direction of the required predetermined synchronous frequency by increments decreasing as the average frequency of said oscillator approaches said predetermined desired frequency.

2. In a synchronizing system, the combination of, a motor to be synchronized, a source of alternating current of controllable frequency for driving said motor, means for generating a control voltage in accordance with a series of synchronizing impulses to control the frequency of said alternating current, and momentary switching means for periodically returning the frequency of said alternating current to a predetermined frequency to condition said source for the reception of said control voltage.

3. In a synchronizing system, the combination of, a periodically operable device to be synchronized, a source of alternating current of controllable frequency for driving said device with a periodicity determined by said frequency, means for generating a control voltage in response to synchronizing impulses to at least partially determine said frequency at periodic intervals, and momentary switching means for conditioning said control voltage generating means for the reception of said impulses periodically to provide substantially instantaneous positive correction of said frequency.

4. In a synchronizing system, the combination of, a periodically operable device to be synchronized, a source of alternating current of controllable frequency for driving said device with a periodicity at least partially controlled by said alternating current, means for generating a control voltage which is a function of the difference between the time of occurrence of a synchronizing impulse and the period of said device, means for applying said control voltage to control the frequency of said alternating current and momentary switching means for periodically substantially depleting said control voltage.

5. In a synchronizing system, the combination of, a periodic operable facsimile scanner, a synchronous motor for operating said scanner, an oscillator for generating a signal to determine the speed of said motor, a source of periodic synchronizing pulses, a capacitor, a switch connected between said source and said capacitor, means for closing said switch for a predetermined time once for each period of said scanner to apply said pulses to charge said capacitor as a function of the overlap of said pulses on the time of closing of said switch, and means for connecting said capacitor to said oscillator to at least partially correct the period of said oscillator to equal the period of said pulses a second switch for at least partially discharging said capacitor, and means for operating said second switch just prior to the operation of said first switch for conditioning said capacitor for charging.

6. A synchronizing system as set forth in claim 5, and including a thyratron for applying said pulses to said switch.

7. A synchronizing system as set forth in claim 5, and including a resistor connected between said source and said capacitor for at least partially controlling the rate of charge of said capacitor.

8. In a synchronizing system, the combination of, a rotating device to be synchronized with a source of periodic impulses, a synchronous motor for rotating said device, a variable frequency oscillator for controlling the speed of said motor, a resistor and capacitor circuit for at least partially controlling the frequency of said oscillator in accordance with the charge in said capacitor, a commutator having at least two segments coupled to said rotating device to rotate said commutator in unison with said device, a contact for connecting said segments sequentially to said capacitor, a circuit connected to one of said segments for discharging said capacitor and a circuit to another of said segments for charging said capacitor in response to said periodic impulses.

9. In a facsimile recorder synchronizing system for synchronizing a recorder drum from synchronizing impulses transmitted at the start of each scanning line, the combination of, a recorder drum, a synchronous motor for rotating said drum, a variable frequency oscillator for determining the speed of said motor, a capacitor connected to said variable frequency oscillator to at least partially determine the frequency of said oscillator in accordance with the charge in said capacitor, a first switch means for charging said capacitor during at least a portion of the period of duration of said impulses for setting the frequency of said oscillator in the direction of synchronism at the start of each scanning line, and a second switch means for at least partially discharging said capacitor just prior to setting of said frequency.

10. In a facsimile recorder synchronizing system for synchronizing a recorder drum from synchronizing impulses transmitted at the end of each scanning line, the combination of, a recorder drum, a synchronous motor for rotating said drum, a variable frequency oscillator for determining the speed of said motor, a capacitor connected to said variable frequency oscillator to at least partially determine the frequency of said oscillator in accordance with the charge in said capacitor, a commutator coupled to said drum to rotate in unison therewith, two adjacent segments on said commutator, one of said segments connected to charge said capacitor in response to said impulses to set the frequency of said oscillator substantially in synchronism with said impulses, and the other of said segments connected to discharge said capacitor just prior to said setting in synchronism to condition said capacitor to receive the first said charge.

FRANK A. HESTER.

REFERENCES CITED

The following references are of record in the file of this patent:

UNITED STATES PATENTS

| Number | Name | Date |
|---|---|---|
| 2,227,049 | Whitaker | Dec. 31, 1940 |
| 2,230,820 | Young | Feb. 4, 1941 |
| 2,230,821 | Artzt | Feb. 4, 1941 |
| 2,230,822 | Artzt | Feb. 4, 1941 |
| 2,350,008 | Artzt | May 30, 1944 |
| 2,371,905 | Mathes | Mar. 20, 1945 |
| 2,383,360 | Artzt | Aug. 21, 1945 |
| 2,399,421 | Artzt | Apr. 30, 1946 |